United States Patent Office 2,837,091
Patented June 3, 1958

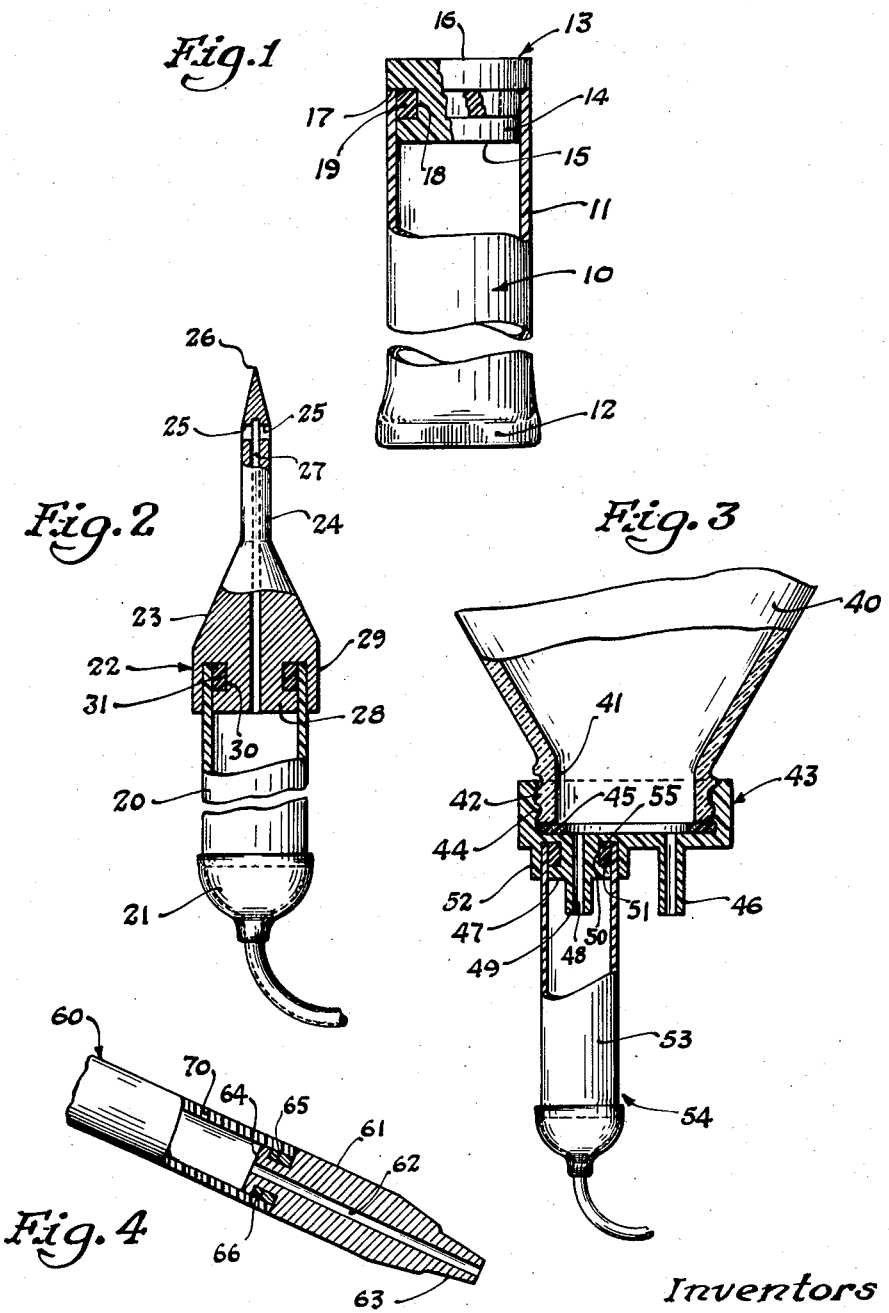

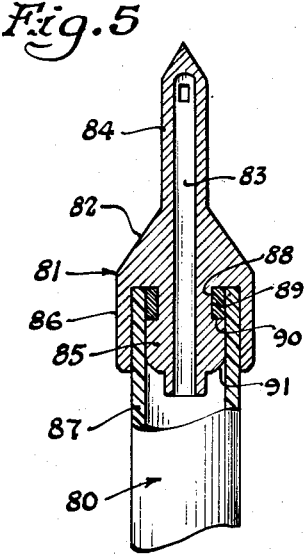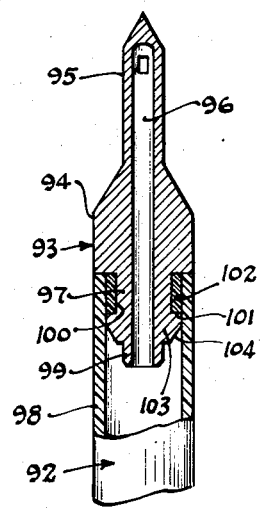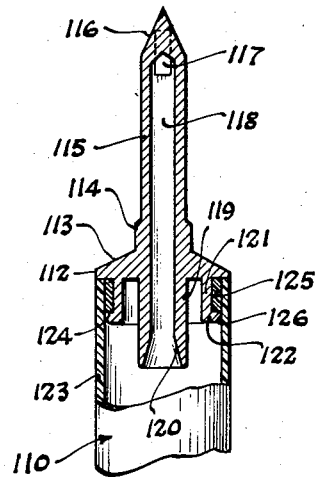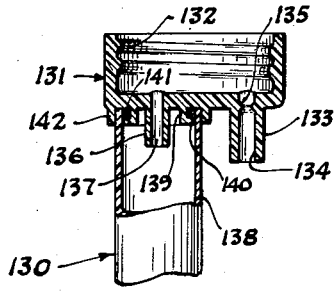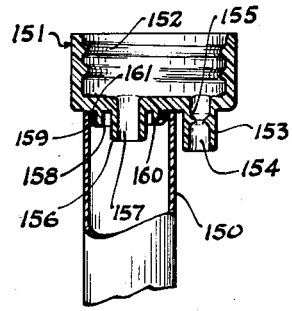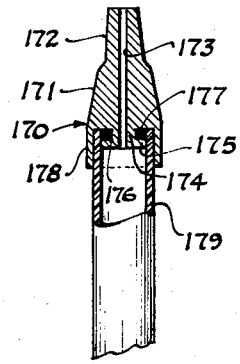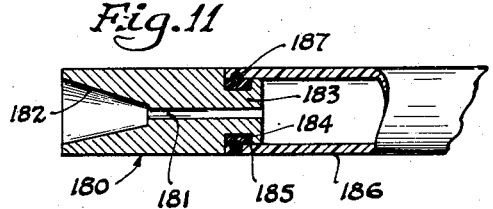

2,837,091

DRIP METER CONNECTING MEANS

Roland A. McMinn and William L. Hartop, Jr., Waukegan, Ill., assignors to Abbott Laboratories, North Chicago, Ill., a corporation of Illinois Application May 5, 1953, Serial No. 353,106

6 Claims. (Cl. 128—214)

This invention relates to means of connecting structural elements and more particularly to means for connecting a length of flexible tubing to a non-flexible member to which said tubing cannot normally be heat or solvent sealed.

In the manufacture of disposable venocylsis equipment suitable for the administration of parenteral fluids it is frequently desirable to form a fluid-tight connection between a length of flexible tubing and a rigid end closure therefor, such as a plastic ampoule, a hypodermic needle adapter or a drip tube and bottle closure, and a piercing needle assembly. The hypodermic needle adapter is of necessity frequently made of a metallic or a plastic composition which is incapable of being heat or solvent sealed to the flexible tubing so as to form the desired fluid-tight connection. For example, when the flexible tubing is made of an elastomeric vinyl chloride polymer and the hypodermic needle adapter made of nylon plastic, it is not possible for the needle adapter and tubing to be joined by means of a solvent seal into a unitary structure capable of being steam sterilized and subjected to the standard pressure and pull tests without destroying the fluid-tight connection between the tubing and the needle adapter. It will also be apparent that a similar problem arises when the needle adapter is made of metal, since it is impossible to heat or solvent seal a length of plastic tubing to the metal surface.

It is therefore an object of the present invention to provide an improved fluid-tight connection between a flexible plastic component and a rigid component to which the plastic component cannot be heat or solvent sealed.

It is another object of the invention to provide an improved fluid-tight connection between one or more flexible components and a rigid component which is capable of withstanding substantial internal pressure and external pulling force without destroying the fluid-tight connection between the flexible and rigid components.

It is also an object of this invention to provide an improved unitary plastic structure comprising two or more plastic components which is capable of being heat sterilized without destroying the fluid-tight connection therebetween.

It is another objective of the invention to provide improved plastic venocylsis equipment.

It is a further object of the invention to provide an improved means for connecting rigid nylon plastic and vinyl chloride containing plastic components.

It is still another object of the invention to provide an improved fluid-tight connection between nylon plastic and vinyl chloride containing plastic components which is capable of being steamed sterilized without destroying the fluid-tight connection. It is also an object of the invention to provide an improved method of joining a flexible component to a rigid component to which the flexible component cannot be heat or solvent sealed.

It is an additional object of the invention to provide an improved method of forming a fluid-tight connection between a flexible component and a rigid component to which the flexible component cannot be heat or solvent sealed.

It is still another object of the invention to provide an improved method of joining nylon plastic and polyvinyl chloride containing plastic components.

Other objects of the invention will be apparent from the detailed description and claims to follow.

In the drawings:

Figure 1 is a side elevation view partially in vertical section shown a flexible plastic container having one end closed with a cap member.

Figure 2 is a side elevation view partially in vertical section shown a bottle closure piercing needle and drip tube assembly.

Figure 3 is a side elevation view partially in vertical section showing a bottle closure cap and drip tube assembly in operative position on a parenteral fluid container.

Figure 4 is a side elevation view partially in vertical section showing a length of flexible tubing connected to a hpodermic needle adapter.

Figure 5 is a fragmentary side elevation view partially in vertical section showing a modified form of a bottle closure piercing needle and drip tube assembly shown in Figure 2.

Figure 6 is a fragmentary side elevation view partially in vertical section showing another modified form of the bottle closure piercing needle and drip tube assembly shown in Figure 2.

Figure 7 is a fragmentary side elevation view partially in vertical section showing a still further modified form of a bottle closure piercing needle and a drip tube assembly shown in Figure 2.

Figure 8 is a fragmentary side elevation view partially in vertical section shown a modified form of the bottle closure cap and drip tube assembly shown in Figure 3.

Figure 9 is a fragmentary side elevation view partially in vertical section of another modified form of the bottle closure cap and drip tube assembly shown in Figure 3.

Figure 10 is a fragmentary side elevation view partially in vertical section showing a modified form of the hypodermic needle adapter and tubing shown in Figure 4.

Figure 11 is an enlarged side elevation view partially in vertical section showing a further modified form of the hypodermic needle adapter and tubing shown in Figure 4.

In the embodiment of the invention shown in Figure 1 of the drawing, the flexible container body 10 is comprised of a length of flexible tubing 11 having its lower end sealed together forming an impervious lower end seal 12. The upper end of the tubing 11 is closed by means of an end closure plug 13, having a cylindrical section 14 which has a maximum diameter suitable for insertion into the interior of the tube 11 preferably without appreciably stretching the end walls of the tubing. In the preferred form, the inner end 15 of the cylindrical section 14 has a diameter substantially the same as the inner diameter of the flexible tubing 11 and the outer end 16 of the plug 13 which does not extend into the interior of the tubing 11 has a diameter substantially the same as the exterior diameter of tubing 11. The surface 17 of the outer end 16 of the plug extends laterally and perpendicularly from the upper surface of the cylindrical section 14 to provide a surface against which the inner end of the flexible tubing 11 abuts when the closure plug 13 is inserted into the flexible tubing 11. Intermediate the inner end 15 and the outer end 16 of the cylindrical section 14 there is provided an undercut portion which forms a restricted section 18 of reduced diameter suitable for receiving a plastic ring member 19 having an exterior diameter substantially the same as the maximum diameter of cylindrical section 14. The plastic ring member 19 has an interior diameter substantially the same as the exterior diameter of the section 18 and has a length which is substantially the same as the height of the restricted section 18. The ring member 19 is made of a material which can be solvent sealed to the flexible tubing 11 and is briefly comprised essentially of the same plastic composition as the flexible tubing 11. The ring member 19 is also preferably in the form of a continuous unbroken section having a sufficient elasticity to slide over the inner end 15 of the plug 13 and thereafter returning to its normal form and engaging the lateral surfaces of the said restricted section 18. It is possible, however, to form the ring of a hard non-resilient plastic material by solvent or heat sealing together two or more rigid sections in the said undercut area thereby providing a unitary ring structure in situ. It is also possible to form the ring member 19 in situ by depositing the desired plastic material from a solvent solution or molding mixture directly into the restricted section 18.

In Figure 2 of the drawing the drip chamber comprises a tubular barrel 20 of transparent flexible resilient plastic material which is sufficiently rigid to retain its original shape but which requires only relatively slight force to collapse. The lower end of the barrel is closed by a reducing cap 21 having a length of small diameter plastic tubing connected thereto. The upper end of the barrel 20 is provided with a bottle closure piercing cap 22 having a generally conical tapered body section 23 which merges at its apex into a smaller diameter elongated section forming a bottle closure piercing needle 24. Lateral openings 25 spaced inwardly of the needle piercing point 26 communicate with the axial passage 27 which extends inwardly through the cap 22 providing unobstructed communication with the interior of the flexible barrel 20 when connected to the cap 22. The inner end of cap 22 is provided with an axial projection 28 extending outwardly from the body section 23. Also extending from the body section 23 is a cylindrical skirt member 29 spaced outwardly from and concentrically with the axial projection 28. The inner diameter of the skirt member 29 is substantially the same as the outer diameter of the flexible barrel 20 and the maximum outer diameter of the axial projection 28 is substantially the same as the inner diameter of the barrel 20, thereby providing the annular race suitable for accommodating the end of the cylindrical barrel 20. Adjacent its base and spaced inwardly from the outer extreme thereof, the projection 28 is undercut to provide an area 30 of smaller diameter than the remaining portion of the projection 28 which accommodates a ring 31 which is comprised of a material to which the barrel 20 surrounding said ring can be solvent sealed.

In Figure 3 of the drawing, the numeral 40 designates a bottle suspended in an inverted position so that its mouth 41 projects downwardly. The mouth 41 is provided with external screw threads 42. The closure cap 43 formed of hard rubber or plastic material or other suitable material is provided with internal screw threads 44 engageable with threads 42. Disposed between the mouth 41 and the inner surface of the cap 43 is a resilient washer 45 which serves as a gasket to assure a liquid-tight seal between the bottle 40 and the cap 43.

Extending outwardly from the outer surface of the cap 43 is a tubular projection 46 having an axial passage therethrough which provides unobstructed communication with the interior of the bottle 40. An air check valve and air filter (not shown) of conventional design is mounted on the tubular projection 46. Also extending outwardly from the lower surface of cap 43 is a second generally cylindrical projection 47 having an axial passage 48 therethrough which communicates with the interior of the bottle 40. The outer extremity of the projection 47 has a smaller diameter than the remainder of the projection and serves as a drip forming outlet 49. At a point adjacent the base, projection 47 is undercut to form an area 50 of smaller diameter with a supporting surface 51 extending laterally from the lower edge of the surface area 50 in a plane substantially perpendicular to the lateral surface of the projection 47. Also extending outwardly from the lower surface of cap 43 and spaced outwardly and concentrically with the projection 47 is a cylindrical skirt 52. The projection 47 and annular skirt 52 forms an annular race therebetween which is suitable for accommodating the end of the transparent flexible barrel 53 which serves as the body of the drip tube 54.

In Figure 4 of the drawing, the numeral 60 designates generally a length of flexible tubing and a hypodermic needle adapter having a cylindrical body section 61 with an axial passage 62 extending therethrough and with one end provided with a tapered surface 63 to which a standard hypodermic needle hub can be frictionally secured. At the other end of the body section 61 is an axial projection 64 having a maximum exterior diameter smaller than the said diameter of the body section 61 and of substantially the same diameter as the interior diameter of the flexible tubing 70 into which the projection 64 is inserted. At a point adjacent the base of the projection and spaced inwardly from the outer extremity thereof, the projection 64 is undercut to form a reduced diameter section 65 which provides a means between section 65 and the inner wall of the flexible tubing telescoping thereover for retaining a ring member 66 which is made of a material to which the tubing 70 can be solvent sealed. The cylindrical body section 61 has a diameter at least as large as the exterior diameter of the tubing 70 to which the adapter is connected so that there is a suitable shoulder at the base of the projection against which the end of tubing 70 abuts when the projection 64 is inserted into the end of the tubing 70, thereby positively limiting the extent to which the tubing 70 telescopes with the needle adapter.

In Figure 5 of the drawing, the numeral 80 designates generally a modified form of the drip tube and closure piercing needle shown in Figure 2 of the drawing. As in Figure 2, the piercing head 81 is comprised of a generally conical body section 82 having an axial passage 83 therethrough and which at its apex merges with a hollow closure piercing needle 84. Extending outwardly from the body section 82 in a direction opposite from that of the piercing needle 84 is an axial projection 85 and a skirt member 86 spaced outwardly from the axial projection and concentrically therewith. The axial projection 85 and the skirt member 86 form an annular race which is adapted to receive the end of the flexible tubing 87 which comprises the body of the drip tube. The axial projection 85 at a point adjacent the base thereof and spaced inwardly from the outer end thereof is undercut to provide a section of reduced diameter 88 suitable for receiving a ring 89 made of a material to which the tubing 87 can be heat or solvent sealed. A supporting surface 90 extends outwardly from the lower edge of section 88 in a plane substantially perpendicular to the lateral surfaces of the axial projection 85. The area of reduced diameter 88 and the supporting surface 90 is adapted to receive and support the ring member 89 which has a maximum exterior diameter substantially that of the axial projection 85 and which occupies substantially the same volume as the undercut portion of the projection 85. The outer edge of the enlarged portion of the projection 85 is beveled as at 91 to facilitate positioning the ring 89. In order to facilitate observation of the rate of the drip, the outer extremities of the axial projection 85 extend a short distance beyond the lower edge of the skirt member 86 providing a drop forming outlet.

In Figure 6 of the drawing, the numeral 92 designates generally a modified form of the drip tube and bottle closure piercing needle head assembly shown in Figure 2. The piercing head 93 is comprised of a generally cylindrical body section 94 which tapers into an elongated hollow closure piercing needle 95 having an axial passage 96 therethrough. Extending outwardly from the body section 94 in a direction opposite from that of the piercing needle 95 is an axial projection 97. The axial projection 97 has a maximum external diameter substantially that of the interior diameter of the tubing 98 which serves as the body of the drip tube to which the closure piercing head is connected. The outer extremity of the axial projection 97 is provided with an area of minimum diameter 99 which serves as a drop forming outlet. At a point adjacent the base of the axial projection 97 and spaced inwardly from the outer extremity thereof, the axial projection 97 is undercut to provide a section of a reduced diameter 100. Extending outwardly from the lower edge of area 99 and in a plane substantially perpendicular to the lateral surface of the projection 97 is a supporting surface 101. The supporting surface 101 provides means for retaining and supporting an annular ring 102 which is made of a material to which the tubing 98 can be solvent sealed. The section of maximum diameter 103 of the axial projection 97 is provided on the outer lateral surface thereof with a beveled surface 104 which facilitates sliding the annular ring 102 over the section of maximum diameter 103 into position around the area of reduced diameter 100 at the base of projection 97.

In Figure 7 of the drawing, the numeral 110 represents generally a still further modified form of the drip tube and bottle closure piercing needle assembly shown in Figure 2. The bottle closure piercing head, comprised preferably of nylon plastic, has a body section 112 with a conically tapered upper surface 113 merging with a cylindrical section 114 of smaller diameter. Extending outwardly from the cylindrical section 114 is an elongated tubular needle section 115 of smaller diameter than the cylindrical section 114. The tubular section 115 is provided with a sharp penetrating point 116 at the outer extremity thereof and with at least one lateral opening 117 adjacent the point 116 which communicates with the axial passage 118 extending through the tubular needle section 115 and through the closure piercing head body section 112. Extending outwardly from the body section 112 in a direction opposite from the needle section 115 is a hollow axial projection 119 which serves as an extension of the axial passage 118. The inner end of the axial passage 118 adjacent the outer end thereof is flared upwardly as at 120 to provide a more suitable drip forming outlet. Also projecting outwardly from the body section 112 is a cylindrical skirt section 121 which is spaced outwardly from and concentrically with the axial projection 119. The outer edge of the section 121 is provided with a laterally extending circular flange 122 the lateral extremities of which have a diameter substantially the same as the inner diameter of the flexible tubing 123 which serves as the body section of the drip tube. The upper surface 124 of the circular flange 122 lies in a plane which is substantially perpendicular to the lateral surface of the skirt section 121 and provides a supporting surface for a ring member 125. The ring member 125 has an inner diameter substantially the same as the exterior diameter of the skirt section 121, an exterior diameter substantially the same as the diameter of the circular flange 122, and a height which is substantially the same as the length of the section 121. The outer surface of the circular flange 122 is tapered to provide a beveled surface 126 which facilitates sliding the ring member 125 over the circular flange 122. The ring member 125 is made of a material to which the flexible tubing 123 can be solvent or heat sealed. Where the tubing 123 is made of "Tygon," a plasticized polyvinyl chloride polymer, the ring member 125 is also preferably made of "Tygon" or a similar material which is comprised essentially of a polyvinyl chloride polymer which may or may not be plasticized. If it is desired to insert the ring member 125 over the circular flange 122 as an integral unit, it is necessary to employ sufficient plasticizer in the polyvinyl chloride polymer or equivalent plastic material which can be heat or solvent sealed to the flexible tubing 123 so as to impart thereto sufficient elasticity to permit sliding the ring member 125 over the circular flange 122. It is evident that the flange 122 on the tubular section 121 in effect provides an undercut section on the tubular section 121 which leaves an area having a diameter less than the internal diameter of the flexible tubing 123 between the body section 112 and the circular flange 122 which is in contact with the inner lateral surface of the flexible tubing 123 and which provides support therefor.

In Figure 8 of the drawing the numeral 130 designates generally a modified form of the bottle closure cap and drip tube assembly shown in Figure 3. The closure cap 131 is preferably formed of a plastic material or other suitable material and is provided with internal screw threads 132 engageable with the exterior threads on the mouth of the bottle. Extending outwardly from the outer surface of the cap member 131 is a tubular projection 133 having an axial passage 134 extending therethrough. The upper end of the tubular projection 133 is provided with a spherical shaped restricted area 135 suitable to receive a metal ball (not shown) and which together function as a ball check valve and seat permitting air to enter the bottle as liquid is withdrawn. Also extending outwardly from the lower surface of cap member 131 is a tubular section 136 preferably of smaller diameter than the tubular projection 133. The tubular section 136 has an axial passage 137 which provides unobstructed communication between the interior of the transparent flexible plastic tubular member 138 which serves as the body of the drip tube. Also extending from the lower surface of the cap member 131 is a cylindrical section 139 which is spaced outwardly from and concentrically with the tubular section 136. Extending laterally from the lower edge of the cylindrical section 139 is a circular flange 140 having the upper surface thereof in a plane which is substantially perpendicular to the lateral surface of the cylindrical section 139. As the exterior diameter of the cylindrical section 139 is less than the internal diameter of the flexible tubing 138 and as the exterior diameter of the circular flange 140 is substantially the same as the internal diameter of the flexible tubing 138, there is provided an area suitable for receiving and retaining ring member 141 which is made of a material to which the flexible tubing can be solvent sealed. Surrounding the cylindrical section 139 and concentrically therewith is a skirt member or depending flange 142 having a length substantially the same as the over-all length of the cylindrical section 139 and flange 140. The internal diameter of the depending flange 142 is substantially the same as the exterior diameter of the flexible tubing 138. By having the depending flange 142 spaced outwardly from and concentrically with the cylindrical section 139 a distance which is approximately the thickness of the wall of the flexible tubing an annular race is provided suitable for receiving the end of the flexible tubing 138.

In Figure 9 of the drawing is shown a still further modified form of the bottle closure cap and drip tube assembly shown in Figure 8. The cap member 151 is provided with internal screw threads 152 which co-act with the external threads on the mouth of the bottle to which it is secured. Extending outwardly from the lower surface of the cap member 151 is a tubular projection 153 having an axial passage 154. At the upper end of the tubular member 153 there is provided a spherical shaped restricted area 155 suitable for receiving a metal ball which together serves as a ball check valve and seat to permit the admission of air into the interior of the bottle when liquid is withdrawn therefrom. Also projecting downwardly from the lower surface of the cap member 151 is a tubular section 156 having axial passage 157 extending therethrough providing uninterrupted communication between the interior of the bottle and the interior of the section of flexible tubing 150 which serves as the body of the drip tube. Surrounding the tubular section 157 and concentrically therewith is a downwardly projecting cylindrical section 158 having a length of less than the length of the tubular section 156. Extending laterally from the lower surface of the cylindrical section 158 is a circular flange 159 which has an exterior diameter substantially the same as the internal diameter of the flexible tubing 150. The upper surface 160 of the circular flange 159 lies in a plane which is substantially perpendicular to the lateral surface of the cylindrical section 158. The circular flange 159 in effect provides the skirt member with an undercut section suitable for receiving and supporting a ring member 161 which has an exterior diameter which is substantially the same as the internal diameter of the flexible tubing 150 and which is made of a material to which the flexible tubing 150 can be solvent sealed.

In Figure 10 of the drawing is shown a modified form of the hypodermic needle adapter and flexible tubing shown in Figure 4. The hypodermic needle adapter 170 has a generally cylindrical body section 171 which is tapered slightly toward its outer end and merges with a tapered section 172 which is preferably provided with a standard Luer taper or other suitable means for frictionally engaging the interior of a hypodermic needle hub. An axial passage 173 extends through the hypodermic needle adapter 170. Extending outwardly in a direction opposite from that of the tapered section 172 is a cylindrical projection 174 and which has extending laterally from the lower edge thereof a circular flange 175. The upper surface 176 of the circular flange lies in a plane which is substantially perpendicular to the lateral surface of the projection 174 and provides a supporting surface for a ring member 177 which has an external diameter substantially the same as that of the circular flange 175. Also projecting downwardly from the body section 171 is a skirt member 178. The skirt member 178 is spaced outwardly from the projection 174 and is concentric therewith. The projection 174 and the skirt member 178 provide an annular race suitable for receiving the end of the flexible tubing 179 to which the hypodermic needle adapter is secured.

In Figure 11 of the drawing is shown a still further modified form of the hypodermic needle adapter and flexible tubing shown in Figures 4 and 10. The hypodermic needle adapter of Figure 11 has a generally cylindrical body member 180 having an axial passage 181 extending longitudinally therethrough. One end of the body member 180 is provided with tapered inner lateral walls which provide a frusto-conical axial depression extending inwardly a short distance to frictionally accommodate a male hypodermic needle hub therein. Extending outwardly from the other end of the body member 180 is an axial projection 183 undercut adjacent the base thereof to provide a reduced diameter section 184 which accommodates a plastic ring member 185 to which the flexible tubing 186 can be solvent sealed. A metal ring member 187 which is capable of serving as an electrode is disposed on the outer surface of the plastic ring member 185 between the said plastic ring member 185 and flexible tubing 186.

In assembling the several embodiments of the invention illustrated in Figures 1 through 11 of the drawing, wherein a rigid molded section, such as the closure plug 13 of Figure 1, is secured to a length of flexible tubing, such as the flexible container body 10 of Figure 1, one method of assembly is to apply to the restricted section 18 of plug 13 a coating of a solution of polyvinyl chloride in a suitable solvent, such as cyclohexanone, or another suitable adhesive, and then slipping the plastic ring member 19 which is solvent sealable to the flexible body member 10 over the enlarged end of the cylindrical section 14 and allowing the ring member to seat in the restricted section 18 and become fixedly secured thereto. The open end of the flexible container body 10 is first dipped into a suitable solvent, such as cyclohexanone when the container body 10 is composed of a polyvinyl chloride plastic, and thereafter the end of the tubing is placed over section 14 and ring member 19 until the end of the tubing abuts the inner surface 17 of the closure plug 13. Upon drying, a firm solvent seal is formed between the container body 10 and the ring member 19 and which together grip the rigid plug 13 preferably formed of nylon plastic. The bond formed between the container body 10 and the ring 10 and the closure plug 13, even after steam sterilization, will withstand the standard pressure and pull tests to which venoclysis apparatus of the type disclosed herein must be subjected. The flexible body member and the closure plug can also be subjected to a twisting force without causing the connection to come unsealed or cause the tubing and ring member to rotate with respect to the rigid closure plug.

In assembling the bottle closure piercing needle and drip tube device shown in Figures 2, 5, 6, and 7, substantially the same procedure is followed as described in connection with the assembly of the container of Figure 1. In the device shown in Figures 5, 6, and 7, the positioning of the ring member shown in the section of reduced diameter of the rigid piercing needle head is facilitated by providing a beveled surface on the projection which supports the ring member.

In like manner the bottle closure cap and drip tube device shown in Figures 3, 8, and 9 and the hypodermic needle adapter and tubing shown in Figures 4 and 10 are assembled in substantially the same manner as described for the container shown in Figure 1.

In the modified form of the needle adapter and tubing shown in Figure 11, an alternate method of assembling the elements thereof is employed. Thus, in place of applying suitable solvent to the end of the tubing, a metal ring 187 is placed medially about the plastic ring 185 composed of a material which can be heat sealed to the flexible tubing 186. After the end of the flexible tubing 186 is placed over the plastic ring 185 and the metal ring 187, the unit is then subjected to heating by dielectric means. There is sufficient flow of plastic to form a firm bond between the plastic ring 185 and the tubing 186. The plastic ring 185 also grips and adheres to the surface of the axial projection 183 so that a fluid-tight connection is formed between the tubing 186 and the rigid plastic needle adapter.

In each of the embodiments of the invention illustrated in the drawing, it is also possible to form the plastic ring member in situ about the section of reduced diameter of the rigid member. The latter method of assembling is particularly suitable for use with the embodiments of the invention which do not employ a cylindrical skirt member surrounding the end of the flexible tubing. Thus, the plastic ring member which is solvent or heat sealable to the length of flexible tubing can be molded in the usual manner about the undercut surface of the axial projection extending outwardly from the body of the rigid member. When the rigid member is composed of nylon plastic, a polyamide plastic, and it is desired to connect therewith a flexible tubing composed essentially of polyvinyl chloride plastic, such as "Tygon" tubing, the ring member is preferably molded of either plasticized or unplasticized polyvinyl chloride plastic. If desired, the molded rigid member such as a nylon closure piercing pin, nylon bottle closure cap, or nylon hypodermic needle adapter can be supplied by the molder with the plastic ring member in position upon the restricted section of the nylon rigid member. Thus, when it is desired to connect a length of flexible tubing to the nylon rigid member, it is only necessary to solvent or heat seal the flexible tubing to the rigid nylon member having the plastic ring molded thereon.

In the prefererd embodiment of the present invention, the flexible tubing used is composed of a vinyl chloride polymer or copolymer plastic. This group of materials includes polyvinyl chloride and the copolymer thereof which are predominately vinyl chloride. Among the principal copolymers are those containing vinyl acetate and vinylidene chloride. The elastomeric or flexible varieties of vinyl plastics are mixtures of vinyl resin with plasticizers, such as high boiling liquids, soft resin, or nitrile rubber, singly or in combination.

While the present invention has been illustrated with particular reference to joining flexible polyvinyl chloride plastic tubing to a rigid nylon part, it should be understod that the present invention can also be used to join in a fluid-tight connection a vinyl tubing to a rigid styrene, phenol formaldehyde plastic and the like or a polyethylene tubing to a rigid nylon, styrene or vinyl plastic part in the same manner as described heretofore. It is also possible to use the present invention to connect a length of flexible tubing to a rigid metallic part which has been provided with the herein disclosed restricted section and laterally extending supporting surface which retains the plastic ring member to which the flexible tubing can be heat of solvent sealed.

The present invention is particularly useful in forming a fluid-tight connection between a rigid venoclysis part and a length of flexible tubing which is capable of withstanding steam sterilization and the necessary pressure and pull tests without impairing the fluid-tight connection. The present invention avoids the necessity of placing the plastic tubing or rigid plastic member under an artificial stress, as by deforming the molded plastic part while being heated or by stretching the flexible tubing over the rigid part, which stress is lost during heat sterilization, or resorting to and resulting in the failure of the fluid-tight connection.

Others may readily adapt the invention for use under various conditions of service, by employing one or more of the novel features disclosed or equivalents thereof. As at present advised with respect to the apparent scope of our invention, we desire to claim the following subject matter.

We claim:

1. A venoclysis apparatus for intravenous administration comprising in combination, a flexible resilient plastic tubular member, a lower end closure for said tubular member having a length of smaller diameter flexible tubing attached thereto, a substantially rigid upper end closure member having passage therethrough, said rigid closure member having a piercing needle extending outwardly therefrom communicating with the said passage, and a cylindrical projection surrounding said passage and extending inwardly into the interior of the said plastic tubular member, said projection having at the outer end thereof a laterally extending flange, and a plastic ring member fixedly secured on the said projection in contact with the said flange and maintained in sealing engagement with the said tubular member, whereby a fluid-tight connection is formed between the said plastic tubular member and rigid end closure member.

2. A venoclysis apparatus for intravenous administration comprising in combination, a flexible resilient relatively thin walled plastic tubular member, a lower end closure for said tubular member having a length of small diameter tubing attached thereto, a substantially rigid upper end closure member having a passage therethrough, said rigid closure member having a piercing needle extending outwardly therefrom communicating with the said passage and a cylindrical projection surrounding said passage and extending inwardly into the interior of the said plastic tubular member, said projection having at the outer end thereof a laterally extending flange the outer edges of which contact the inner surface of the said tubular member, a cylindrical skirt member concentrically disposed about the said projection and spaced therefrom a distance approximately the thickness of the wall of the said plastic tubular member, and a plastic ring member fixedly secured on the said projection in contact with the said flange and maintained in sealing engagement with the said tubular member, whereby a fluid-tight connection is formed between the said plastic tubular member and rigid end closure member.

3. A venoclysis apparatus for intravenous administration comprising in combination, a flexible resilient plastic tubular member, a lower end closure for said tubular member having a length of small diameter flexible tubing attached thereto, a substantially rigid upper end closure member having a conduit means extending therethrough with the lower end thereof forming a visible drip discharge outlet within the said tubular member, a piercing needle extending outwardly from the body section of the said rigid member in communication with the said conduit means and a cylindrical projection surrounding said conduit means extending inwardly from the said body section into the interior of the said plastic tubular member, said projection having at the outer end thereof a laterally extending flange, and a plastic ring member fixedly mounted on the said projection in contact with the said flange and maintained in sealing engagement with the said tubular member, whereby a fluid-tight connection is formed between the said plastic tubular member and rigid end closure member.

4. A venoclysis apparatus for intravenous administration comprising in combination, a flexible resilient plastic tubular member, a lower end closure for said tubular member having a length of small diameter flexible tubing attached thereto, a substantially rigid upper end closure member having a conduit means extending therethrough, said rigid closure member having on one side thereof means for engaging the discharge outlet of a fluid container and having on the other side thereof a projection surrounding said conduit means extending into the interior of the said tubular member, said projection having at the outer end thereof a laterally extending flange, and a plastic ring member fixedly mounted on the said projection in contact with the said flange and maintained in sealing engagement with the said tubular member, whereby a fluid-tight connection is formed between the said plastic tubular member and the rigid end closure member.

5. A venoclysis apparatus for intravenous administration comprising in combination, a flexible resilient relatively thin wall plastic tubular member, a lower end closure for said tubular member having a length of smaller diameter flexible tubing attached thereto, a substantially rigid upper end closure member having conduit means extending therethrough, said rigid closure member having on one side thereof means for engaging the discharge outlet of a fluid container and having on the other side thereof a projection surrounding said conduit means extending into the interior of the said tubular member, said projection having at the outer end thereof a laterally extending flange the outer edge of which contacts the inner surface of the said tubular member, a cylindrical skirt member concentrically disposed about the said projection and spaced outwardly therefrom a distance of approximately the thickness of the wall of the said plastic tubular member, and a plastic ring member fixedly secured on the said projection in contact with the said flange and maintained in sealing engagement with the said tubular member, whereby a fluid-tight connection is formed between the said plastic tubular member and rigid end closure member.

6. A venoclysis apparatus for intravenous administration comprising in combination, a flexible resilient plastic tubular member, a lower end closure for said tubular member having a length of smaller diameter flexible tubing attached thereto, a substantially rigid upper end closure member having a fluid conduit means extending therethrough with the lower end thereof forming a visible drip discharge outlet, said rigid closure member having on one side thereof means for engaging the discharge outlet of a fluid container and having on the other side thereof a projection surrounding said conduit means extending into the interior of the said tubular member, said projection having at the outer end thereof a laterally extending flange, and a plastic ring member fixedly secured on the said projection in contact with the said flange and maintained in sealing engagement with the said tubular member, whereby a fluid-tight connection is formed between the said plastic tubular member and rigid end closure member.

References Cited in the file of this patent
UNITED STATES PATENTS

| | | |
|---|---|---|
| 373,322 | Ward | Nov. 15, 1887 |
| 984,808 | Glocker | Feb. 21, 1911 |
| 1,324,896 | Hettinger | Dec. 16, 1919 |
| 2,095,209 | Brownsdon | Oct. 5, 1937 |
| 2,207,294 | Hubner et al. | July 9, 1940 |
| 2,461,414 | Donner | Feb. 8, 1949 |
| 2,528,737 | Butler | Nov. 7, 1950 |
| 2,729,364 | Malko | Jan. 3, 1956 |